US007809410B2

(12) United States Patent
Palum et al.

(10) Patent No.: US 7,809,410 B2
(45) Date of Patent: Oct. 5, 2010

(54) POWER MANAGEMENT SYSTEM FOR SCA BASED SOFTWARE DEFINED RADIO AND RELATED METHOD

(75) Inventors: Lloyd Palum, Rochester, NY (US); Daniel E. Stephens, Rochester, NY (US); Scott Zeller, Shortsville, NY (US)

(73) Assignee: Harris Corporation, Melbourne, FL (US)

( * ) Notice: Subject to any disclaimer, the term of this patent is extended or adjusted under 35 U.S.C. 154(b) by 688 days.

(21) Appl. No.: 11/274,615

(22) Filed: Nov. 15, 2005

(65) Prior Publication Data

US 2007/0111718 A1    May 17, 2007

(51) Int. Cl.
*H04B 1/38* (2006.01)
(52) U.S. Cl. .................. 455/574; 455/418; 455/572; 713/300; 713/320
(58) Field of Classification Search ............. 455/574
See application file for complete search history.

(56) References Cited

U.S. PATENT DOCUMENTS

| 3,932,847 | A | | 1/1976 | Smith ................ 340/172.5 |
| 4,349,890 | A | | 9/1982 | Chang ................ 364/900 |
| 5,040,158 | A | | 8/1991 | Lee et al. ................ 368/10 |
| 5,327,468 | A | | 7/1994 | Edblad et al. ............. 375/107 |
| 6,131,166 | A | * | 10/2000 | Wong-Insley ............ 713/300 |
| 6,804,169 | B2 | | 10/2004 | Addy et al. ............... 368/10 |
| 2002/0082044 | A1 | * | 6/2002 | Davenport ............. 455/552 |
| 2003/0114163 | A1 | | 6/2003 | Bickle et al. ............ 455/450 |
| 2004/0063425 | A1 | | 4/2004 | Wakutsu et al. .......... 455/418 |
| 2004/0133554 | A1 | | 7/2004 | Linn et al. ............. 707/2 |
| 2004/0242261 | A1 | * | 12/2004 | Fette ................ 455/550.1 |
| 2004/0266494 | A1 | * | 12/2004 | Ruuska et al. ........... 455/574 |
| 2005/0108382 | A1 | * | 5/2005 | Murotake et al. ........ 709/223 |
| 2005/0261038 | A1 | * | 11/2005 | Chary ................ 455/574 |
| 2007/0073997 | A1 | * | 3/2007 | Fette et al. ............ 712/1 |

* cited by examiner

*Primary Examiner*—Vincent P Harper
*Assistant Examiner*—Mazda Sabouri
(74) *Attorney, Agent, or Firm*—Allen, Dyer, Doppelt, Milbrath & Gilchrist, P.A.

(57) ABSTRACT

A software defined radio includes a radio circuit powered by a battery and formed as a pair of radio subsystems having radio components that draw power from the battery. An executable radio software system conforms to the Software Communications Architecture (SCA) specification and defines an operating platform environment that allows a waveform application to operate with the radio circuit. A power management service is operative with the pair of radio subsystems to coordinate the power among the radio components.

21 Claims, 10 Drawing Sheets

POWER MANAGEMENT SYSTEM FOR SCA BASED SOFTWARE DEFINED RADIO AND RELATED METHOD

FIELD OF THE INVENTION

The present invention relates to a software communications architecture (SCA) for software defined radios, and more particularly, the present invention relates to power management in software defined radios.

BACKGROUND OF THE INVENTION

With advances in processing capabilities and programming technologies, software defined mobile wireless communications devices (e.g., radios) continue to increase in popularity. Rather than relying upon hardware and circuitry components to perform tasks such as frequency, modulation, bandwidth, security functions, and waveform requirements, these functions are performed by software modules or components in a software radio. That is, with a software radio analog signals are converted into the digital domain where the above-noted functions may be performed using digital signal processing.

Because most of the functions of the radio are controlled by software, software radios may typically be implemented with relatively standard processor and hardware components. This may not only reduce device hardware costs, but is also provides greater flexibility in upgrading the device since new communications waveform modules can be uploaded to the device relatively easily and without the need to interchange new hardware components.

One particular class of software radio, which takes advantage of the above-described advantages features is the Joint Tactical Radio (JTR). The JTR radio includes relatively standard radio and processing hardware along with the appropriate waveform software modules for the communication waveforms the radio will use. JTR's also use operating system software that conforms with the Software Communications Architecture (SCA) Specification (see www.JTRS.saalt.mil), which is hereby incorporated by reference in its entirety. The SCA is an open architecture framework that specifies how hardware and software components are to interoperate so that different manufacturers and developers can readily integrate their respective components into a single device.

Still another class of mobile wireless communications devices that increasingly use software components for communicating with different waveforms or protocols are cellular communication devices. That is, many cellular devices are now designed to operate with more than one of the numerous cellular standards that are used throughout the world, such as the Global System for Mobile Communications (GSM) and Personal Communications Services (PCS), for example.

The Joint Tactical Radio System (JTRS) Software Component Architecture (SCA) defines a set of interfaces and protocols, often based on the Common Object Request Broker Architecture (CORBA), for implementing a Software Defined Radio (SDR). In part, JTRS and its SCA are used with a family of software re-programmable radios. As such, the SCA is a specific set of rules, methods, and design criteria for implementing software re-programmable digital radios.

The JTRS SCA specification is published by the JTRS Joint Program Office (JPO). The JTRS SCA has been structured to provide for portability of applications software between different JTRS SCA implementations, leverage commercial standards to reduce development cost, reduce development time of new waveforms through the ability to reuse design modules, and build on evolving commercial frameworks and architectures.

The JTRS SCA is not a system specification, as it is intended to be implementation independent, but a set of rules that constrain the design of systems to achieve desired JTRS objectives. The software framework of the JTRS SCA defines the Operating Environment (OE) and specifies the services and interfaces that applications use from that environment. The SCA OE comprises a Core Framework (CF), a CORBA middleware, and an Operating System (OS) based on the Portable Operating System Interface (POSIX) with associated board support packages. The JTRS SCA also provides a building block structure (defined in the API Supplement) for defining application programming interfaces (APIs) between application software components.

The JTRS SCA Core Framework (CF) is an architectural concept defining the essential, "core" set of open software interfaces and profiles that provide for the deployment, management, interconnection, and intercommunication of software application components in embedded, distributed-computing communication systems. Interfaces may be defined in the JTRS SCA Specification. However, developers may implement some of them, some may be implemented by non-core applications (i.e., waveforms, etc.) or and some may be implemented by hardware device providers.

The specifications for the JTRS radio and SCA typically require an interface for command and data (red and black) processing systems. A radio platform may include multiprocessor embedded systems, including Field Programmable Gate Arrays (FPGA's) and Digital Signal Processors (DSP's).

In the typical military applications for these radios, many of the current radio platforms have a high degree of vertical integration between the hardware and software. This has proven to be a difficulty when upgrading the platforms and has been a driving factor behind the definition and realization of this Joint Tactical Radio System (JTRS) Software Communication Architecture (SCA). At the same time, mission requirements for battery life have remained the same or increased. The vertical integration of many of the current force radio platforms contributes significantly to the level of performance that is obtained in power management and battery life. In the past, power efficient application specific hardware components were used where today the SCA standard is calling for programmability. Legacy radio implementations relied to a large extent on digital signal processors that are traditionally more power efficient from a MIPS per milliwatt perspective than the general purpose processors that are called for in the SCA defined radios.

SUMMARY OF THE INVENTION

A software defined radio includes a radio circuit powered by a battery and comprising a pair of radio subsystems each having radio components that draw power from a battery. An executable radio software system is operable with the radio circuit and conforms to the Software Communications Architecture (SCA) specification and defines an operating platform environment that allows a waveform application to operate with the radio circuit for transmitting and receiving voice and data. A power management service is operable with the pair of radio subsystems to coordinate the power among the radio components.

In one aspect of the present invention, the power management circuit is operable for coordinating radio components in a master slave configuration. In yet another aspect, the pair of radio subsystems can include a red general purpose processor and a black general purpose processor. In a non-limiting example, the power management service is operable for coordinating the red general purpose processor as a master and the black general purpose processor as a slave, but these can be reversed. The power management service is operable with the waveform application to enter an active receive, active transmit and quiescence state. The power management service includes a port through which any radio components can be operable as clients for control by the power management service. Clients can also include any currently active waveform application and a system control processor operative with the operating platform environment. The clients can be queried by the power management service for acknowledging a suspension of power and initiating a sequence of power suspend actions by the power management service. Any client can initiate an interrupt to the power management service such that the sequence of power suspend actions can be aborted. After the sequence of power suspend actions are aborted, any power suspend actions already occurring can be reversed.

In yet another aspect, the radio component can include a Global Positioning Sensor (GPS), a data device having Data Termination Equipment (DTE) serial ports, and a voice circuit having a Digital Signal Processor (DSP), wherein the power management service is operative for managing a) on/off cycles for the GPS, b) power to the DTE serial ports, and c) power settings to the DSP for waveform applications.

A method aspect is also disclosed.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

In accordance with one non-limiting aspect of the present invention, a set of power management states can be defined for each of the components that make up the hardware architecture of a software defined radio using a software communications architecture (SCA). This set of component power management states can be built on a high-level power management state model formed for the radio as a whole. Some of these radio power management states can be delegated to the platform operating environment software and some to the currently running application software. For purposes of description, a general software defined radio will be described followed by a description of the hardware architecture and software architecture used in the software defined radio operative with the software communications architecture, followed by a more detailed explanation of the power management system and method of the invention.

Figure 1:
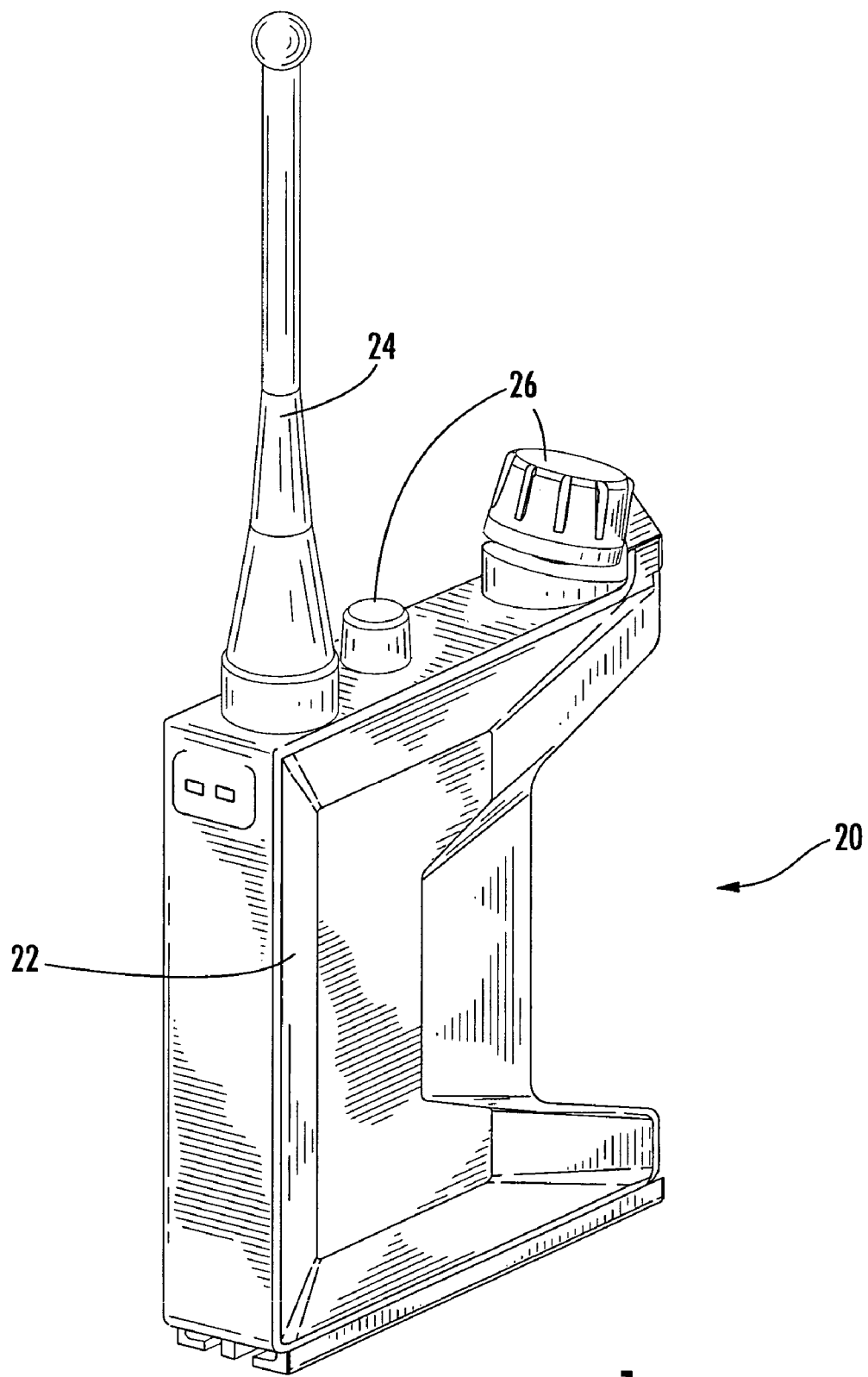
FIG. 1 is perspective view of a portable wireless communications device as a handheld radio that could incorporate the power management system in accordance with a non-limiting example of the present invention.

The power management system and related methods, in accordance with non-limiting examples of the present invention, can be used for any type of radio software communications architecture as used on mainframe computers or small computers, including laptops with an added transceiver, such as used by military and civilian applications, or in a portable wireless communications device 20 as illustrated in FIG. 1. The portable wireless communications device is illustrated as a radio that can include a transceiver as an internal component and handheld housing 22 with an antenna 24 and control knobs. A Liquid Crystal Display (LCD) or similar display can be positioned on the housing in an appropriate location for display. The various internal components, including dual processor systems for red and black subsystems and software that is conforming with SCA, is operative with the illustrated radio. Although a portable or handheld radio is disclosed, the architecture as described can be used when any processor system operative with the transceiver using SCA and the power management system in accordance with the present invention.

It should be understood that horizontal layering of the radio platform allows for independent evolution of the hardware, the operating environment, and the applications. The key to maintaining performance critical vertical integration is to define the right set of power control facilities in each horizontal layer through a set of application programming interfaces (APIs). These APIs can be used to tie the horizontal layers of the radio together into a vertical power management solution that takes into account the discrete power management states of the platform and its constituent applications.

Figure 2:
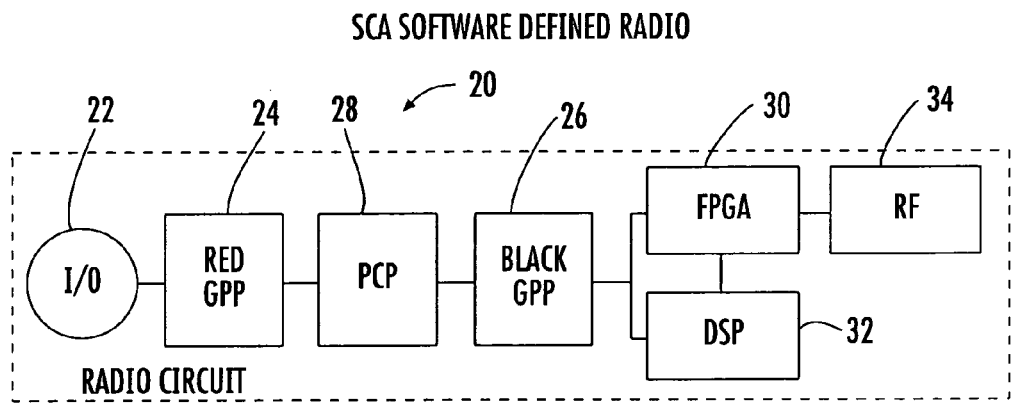
FIG. 2 is a high-level block diagram of an example of the software communications architecture (SCA) hardware components that could be operable to use the power management system in a non-limiting example of the present invention.

The SCA standard calls for a certain hardware and software complement. FIG. 2 shows a SCA compliant hardware architecture for a radio indicated by the dashed lines at 20, which can be used as a context for a power management definition and approach.

Input and Output (I/O) 22 occurs for dedicated general purpose red and black processors (GPP's) 24,26, which are provided on either side of a programmable cryptographic processor (PCP) 28. These GPPs 24,26 are typically Reduced Instruction Set Computers (RISC) that have sufficient memory and processing resources to handle necessary functions in the SCA architecture allocated to unencrypted data (red) processing and encrypted data (black) processing in one non-limiting example. For military applications, the PCP 28 is typically a government-endorsed module that supports the Cryptographic Equipment Applications that are required by the radio. Closer to the antenna and mapped into the address space of the black GPP 26 are usually programmable hardware such as a Field Programmable Gate Array (FPGA) 30 and a digital signal processor (DSP) 32 and associated assets that are required to perform application specific modem and protocol functions. The radio RF hardware 34 is provided for the distinct frequency bands, channel bandwidths, and power levels needed by the target applications of the radio.

Figure 3:
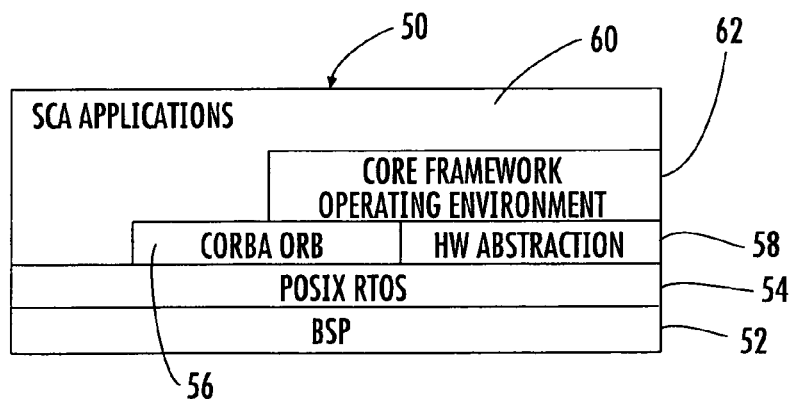
FIG. 3 is a high-level block diagram of an example of the software architecture that is operable in accordance with one non-limiting example of the present invention.

FIG. 3 is a block diagram of a SCA compliant software architecture, indicated generally at 50, which can be used as a context for the power management design approach.

The GPPs 24,26 (FIG. 2) typically have a low level layer of software called a board support package (BSP) 52 that contains the hardware specific drivers and software functions that are required to run a Portable Operating System Interface (POSIX) compliant Real Time Operating System (RTOS) 54. The SCA Application Environment Profile (AEP) dictates the use of CORBA middleware for intra-component communications and the POSIX compliant operating system on the GPP. The middleware includes the CORBA ORB 56 and a hardware abstraction 58 as part of a component power management service definition. SCA application 60 include the core framework operating environment 62 with a radio power management service definition in accordance with one non-limiting aspect of the present invention.

It is also typical to include a low level layer of software in the radios on the GPP that abstracts the platform specific features into a generic set of hardware based functions that can be used by the SCA devices and services. The DSP and FPGA resources of the radio have also recently become the focus of the SCA Version 3.0 in the specialized hardware supplement, the disclosure which is hereby incorporated by reference in its entirety. This supplement extends the definition of the SCA AEP to include a definition of the platform environment on the DSP and FPGA resources. The JTRS SCA compliant application software is developed to this set of standards. This is the basis of application portability and the environment for which a set of power management capabilities are defined in accordance with one non-limiting example of the present invention.

There are no established sets of features or Application Programming Interfaces (APIs) in the software environment that can be used to pull this highly layered software architecture together, and, as a result, the kind of vertical coordination between the layers of software that is necessary needs to be defined on a platform-by-platform basis. The facilities that are available on a given platform are highly dependent on the hardware architecture. The differences in processors and peripherals make it difficult to call out a standard set of power management facilities. Platform peripheral sizing and resource requirements are often tied to the worst case anticipated application requirements.

The power management facilities in an SCA radio can be defined as a set of power management states for each of the components that make up the hardware architecture of the radio. In accordance with one non-limiting example of the present invention, this set of component power management states are used to form a high-level power management state model for the radio as a whole. Some of these radio power management states can be delegated to the platform operating environment software and some to the currently running application software.

In accordance with a non-limiting example of the present invention, power management states can be applied to the major components and subsystems of the radio. A brief description of these power management states follows.

A "Powered On" power management state is a normal operating mode of a given subsystem or component. The power management technique that is usually in effect in this mode is the scaling of the operating clock frequency. This state is concerned with not exceeding the performance necessary to perform the current processing functions. A clock frequency is used that is typically only as fast as it is required. Processor resources such as GPP, DSP, and PCP employ some operating frequency scaling and in some cases couple this with scaling of the core voltage. FPGA resources (if designed to include this capability) can also scale operating frequencies. RF modules do not usually employ scaling.

A "Suspended" power management state is an operating mode where a component is suspended and any interrupt or hardware level signaling will cause the component to resume operation. The time it takes to get from this mode to the powered up state is relatively fast and is typically on the order of the interrupt latency time of a processor. The entire context of the component is still active when it resumes. Processing elements typically retain program and data storage in this mode. The processor resources such as GPP, DSP, and PCP include specific instructions to reduce power during periods of inactivity. The idle thread of the operating system typically executes these instruction(s) to suspend the processor during times of inactivity.

A "Sleeping" power management state is an operating mode of a component that requires a "soft reset" to bring it back on line. Ideally, a mechanism to restore the processor context from memory is possible rather than investing the time to do a complete reboot of the processor. This operation could take on the order of 10 to 100 milliseconds and can be initiated by a non-maskable input (reset). Program and data storage for processors typically could remain active in this mode, which is similar to the suspended state, except that there is usually a deeper level of power savings at the expense of requiring more time to restore the component to operation.

A "Powered Off" power management state is the gating of power and/or clocks to a device. When a device is brought back up, it may require a reboot and complete re-initialization. The use of this mode is highly dependent on whether the time it takes to bring the component back on line is allowable. This mode is also applicable with elements of the radio that are independently powered on and off based on whether the radio-operating mode requires the component to be used. RF Components, I/O circuits, networking interfaces, and LCD screens are all components that would fall into this category.

Different high-level radio power management states can use the component states as described above. A set of high-level states can be defined for the radio and a power management state coordinated for each of the radio components to reduce the overall power draw of the radio.

A Booting or Configuration radio power management state is one such state. During the booting or configuration of the radio, typically all of the resources that are required for the current operating mode are actively involved. The respective clock frequencies of these components could be scaled to be consistent with the function that is being configured. It is typical that the GPP components are configured to run at the highest performance point during periods of configuration to minimize startup times. This state is under the control of the radio operating environment software.

In an active transmit state, the radio is modulating and passing data/voice through the radio from the I/O interface to the antenna. In an active receive state, the radio is demodulating and passing data/voice through the radio from antenna to the I/O interfaces. It is typical in this state that the processing resources can be scaled and that there may be periods of inactivity that allow certain components to be suspended. This state is typically coordinated between the operating environment and currently running application(s). The operating environment has a good sense of what components can be powered off because they are not being used and the application(s) are best suited to scale the performance to a level commensurate with the current level of processing.

There can be a protocol specific operation, depending on what application is currently running, further power savings may be realized by taking advantage of the specific protocol used by an application. For example, some applications may actively turn the RF module on and off in a specific duty cycle to save power and still provide adequate probability of signal detection. This is possible when the on air signaling is sufficient to allow the application to process only part of the signal and still synchronize with the transmitting radio. This type of scheme can provide significant power savings. The generic term used for this application behavior is a "sleep"/"sniff" cycle. In the "sniff" phase the radio components will be powered off or in the sleep mode with the exception of the DSP, FPGA, and RF receiver (components needed to do signal acquisition). In the "sleep" phase the radio components will be powered off or in the sleep mode with the exception of the DSP and FPGA, which will need to wake up quickly.

In standby mode all of the radio components are powered off with the exception of the GPP, which will be in a sleep state. This power management state is typically entered over a long period of inactivity and is not always enabled by the user of the radio. It is understood that it may take several seconds to return to the active state due to the amount of time required to reconfigure many of the radio components. This mode is effective in providing prolonged battery life.

Several factors affect how the different radio level power management states should be controlled or "orchestrated" to provide an improved battery life to the radio. The component level power management is primarily concerned with the provided level of power savings versus how long it takes to transition between these states. Some power savings are not realizable because the application cannot wait for the component to come back into operation. This is typically resolved in the integration of a particular application with the radio operating environment. Depending on the needs of the application, it may not always be possible to configure some components to the state(s) offering the greatest power savings. The potential need for different applications to configure components to different power saving states must be accounted for in the power management APIs that are provided in the applications.

Another factor that dictates whether power savings can be realized is the frequency of radio level power management state transitions. It is desirable if a system avoids powering components on and off in a duty cycle that ends up consuming more power than if the component were not managed, or creates undesirable effects such as power system modulation. The power management system of the present invention can include heuristics that "smooth" the duty cycle of radio level power management state transitions.

User control is also important. Users of the radio need the ability to turn power management capabilities on and off, to allow them to trade off battery life versus mission needs. Typically, the user of the radio becomes "trained" on how the radio reacts when actively managing power and they are given the choice of whether the management is enabled or not.

The Power Management Service, in accordance with one non-limiting aspect of the present invention, coordinates with the radio platform and waveform software to actively manage the hardware resources of the radio to minimize power consumption and in turn maximize the battery life of the radio.

An example of radios that can be operable for use with the present invention are the Falcon II or Falcon III radios manufactured and sold by Harris Corporation of Melbourne, Fla. In one non-limiting example of the present invention, the power management system includes a pair of coordinating Core Framework::Resources as classes operable with the software. These resources behave in a master slave configuration where, in one non-limiting example, the master component is resident on the red general purpose processor 24 and the slave is resident on the black general purpose processor 26 (FIG. 2), although these could be reversed, of course, as known to those skilled in the art. The description will proceed, however, with the red GPP 24 considered a master. These components coordinate to reduce power and in some cases power down the red and black elements of the radio in a synchronized and predictable fashion. It is understood that the system control process and the active waveform will interact with the power management service to translate high level system events like power-up complete and squelch on or off into calls to the power management service to reduce system power. The fundamental design of the power management is centered on different premises as explained below.

First, when power management is enabled, the clock and bus speed will be scaled based on system demand. The highest performance point (maximum clock and bus speed) will be automatically entered upon any general purpose processor interrupt. Scaled performance will be initiated when the operating system idle task is entered (i.e., when the OS determines there is no more work to be done). The scaling or power management of a Device (and its associated hardware) is performed by the Device itself. A Device may obtain the power management enabled/disabled state through the system configuration.

Second, radio applications in general respond to user input such as keypad or key line entry and over the air signal detection. During periods of inactivity where there is no user input or signal presence, the radio processing resources can be significantly reduced. The assumption is that the applications only use the DSP and/or FPGA resources to perform signal detection. Application designers should strive to make this assumption true in order to realize the maximum benefit of the power management service. In some applications, it is possible to obtain further power savings by the application "self" managing the DSP and FPGA resources in the periods of time where the application is looking for signal presence. This is often referred to as a sleep/sniff cycle where the application will turn on and off the RF and signal processing resources in a duty cycle consistent with reducing power but still accurately recognizing active signaling (maintaining a high probability of synchronization in real world channel conditions).

Figure 4:
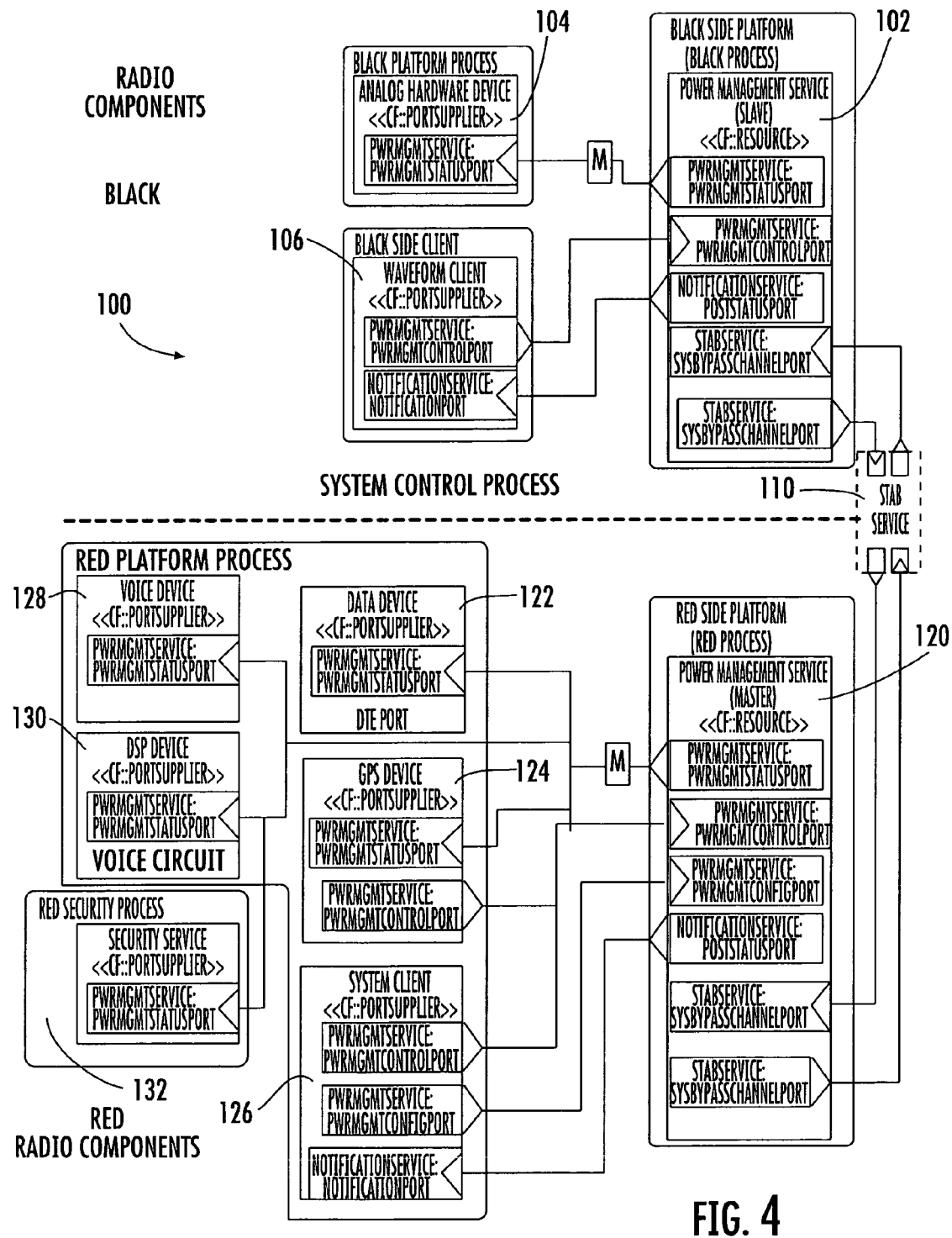
FIG. 4 is a block diagram showing the interaction among various power management components used in the software communication architecture for a software defined radio in accordance with one non-limiting example of the present invention.

FIG. 4 is a non-limiting example of a context diagram of the radio power management service 100 that outlines the master slave configuration of the service and the expected connection to system and application resources that inform the service of high-level power management events. The system 100 includes a power management service as a slave 102 that is part of the black side platform (although it could be red) and black process and includes various ports, including a power management status port, power management control port, post status port, and system bypass channel ports. The power management service as a slave 102 is operable with an analog hardware device as part of the black platform process that includes a power management status port. The black side client includes a waveform client that includes a power management control port and notification port. The power management service 102 is operable through a STAB service 110, operable with the red side platform as a red process with a power management service as a master 120 (although it could be the black side). The power management service as a master 120 includes a power management status port, power management control port, power management configuration port, post status port, and system bypass channel ports. A data device 122 includes a power management status port. A GPS device 124 includes a power management status port and power management control port. A system client 126 includes a power management control port, power management configuration port, and notification port. The red platform process further includes a voice device with a power management status port, DSP device with a power management status port and security service 132 with a power management status port.

The Power Management Service 102 provides a Control Port through which interested clients may participate in the power management process. Clients cast their "vote" for or against suspend. When all participants agree that it is okay to suspend, the service begins sequencing through a list of suspend actions which include notifying radio devices that suspend is about to occur and stopping the general purpose processors. If at anytime during the suspend sequence an interrupt occurs or one of the clients votes against suspending, the power management service will abort the sequence, reversing any actions already taken.

For example, two main clients of the Power Management Service are a system control process and a current active application as a waveform. The system control process uses the methods provided on the Power Management Control Port to vote against suspending during startup and when changing the active application. These are two system activities where it would not be acceptable for the power management service to initiate a suspend sequence.

Similarly, an active application would use the Power Management Control Port to vote for suspend when it is actively squelched and not transmitting. During this time, a waveform may only use the DSP to acquire a signal and therefore it would be acceptable for the Power Management Service 120 to initiate a suspend sequence (i.e., suspend the general purpose processors, voice processor, cryptographic, etc.).

Figure 5:
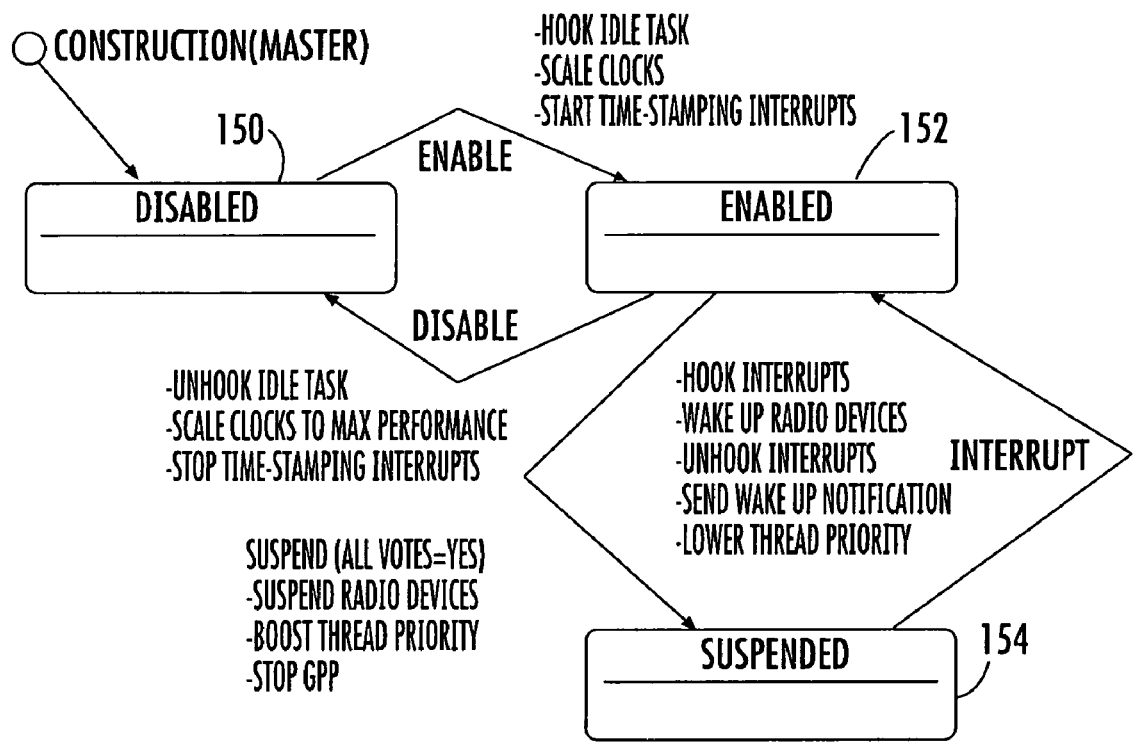
FIG. 5 is a power management state diagram showing different states of the power management for the power management system in accordance with one non-limiting example of the present invention.

The power management service is implemented as a master/slave pair of resources that coordinate the scaling of system performance and the act of suspending and waking up radio hardware components. The state diagram shown in FIG. 5 outlines the behavior of the master and slave power management components. As illustrated, the state diagram shows disabled 150, enabled 152, and suspended 154 states with basic descriptions, including the flow of enable, disable and interrupt signals.

The Power Management Service is constructed as either a master or slave. When the component is started the Core Framework connects the master and slave together using the provided ports during the normal course of system component connection. The Power Management Service does not perform any power management capabilities until it is enabled through any interfaces of a configuration port. Other external applications (e.g., Devices or Services) can obtain the enabled state of power management through the system configuration.

The following is a list of actions to be taken by specific devices when Power Management is enabled.

1. The GPS device 124 manages periodic power on/off cycle to acquire position;
2. The DataDevice 122 manages power to DTE Serial ports;
3. The VoiceDevice 128 scales DSP to lowest power setting that can be utilized by the current waveform PRESET; and
4. A Port Manager shuts down unused console port(s).

Once the power management service is enabled, the radio will be suspended when all participating clients agree to do so. It is important to note the power management state machines allow the radio to wakeup in reaction to either red to black events such as the keyline or user input as well as black to red events such as waveform signal detection (this includes aborting a suspend sequence already in progress).

The Power Management Service consists of two PowerManagementService components, one on each general purpose processor. The PowerManagementService initializes its internal state machines to be in an idle state with no active power management enabled. Various operations can be operable as explained below.

1. Resource::getPort—the Power Management Service does not have any class-specific getPort behavior, the getport functionality inherited from the CF::Resource base class is sufficient.
2. Resource::initialize—the Power Management Service creates and activates all port objects and place them in its port map.
3. Resource::releaseObject—the Power Management Service will deactivate and destroy all port objects found in its port map followed by deactivating and releasing itself. It is not anticipated that this method will be used.
4. Resource::configure—the Power Management Service does not have any properties to configure.
5. Resource::query—the Power Management Service does not have any properties to query.
6. Resource::runTest—the Power Management Service does not have any tests to perform at this time, it will always report success.

The Power Management Service provides different ports. The Power Management Control Port (PwrMgmtControlPort) is used by clients to vote for or against power management suspend.

The Power Management Configuration port (PwrMgmtConfigPort) enables and disables the power management service.

The System Bypass Channel Port (SysBypassChannelPort) provides the receive portion of the communications channel between red and black power management services.

The Power Management Service Uses ports are used to communicate between the power management service master and slave components, as well as between the power management service and other Radio Devices and Services.

The PwrMgmtStatusPort provides power management status information to other devices and services.

The SysBypassChannelPort provides the transmit portion of the communications channel between red and black power management services.

A Single Uses Post Status Port is used by the Power Management Service to notify clients that a "Wakeup" event has occurred. That is, that the radio has either come out of suspend or aborted a suspend sequence.

Figure 6:
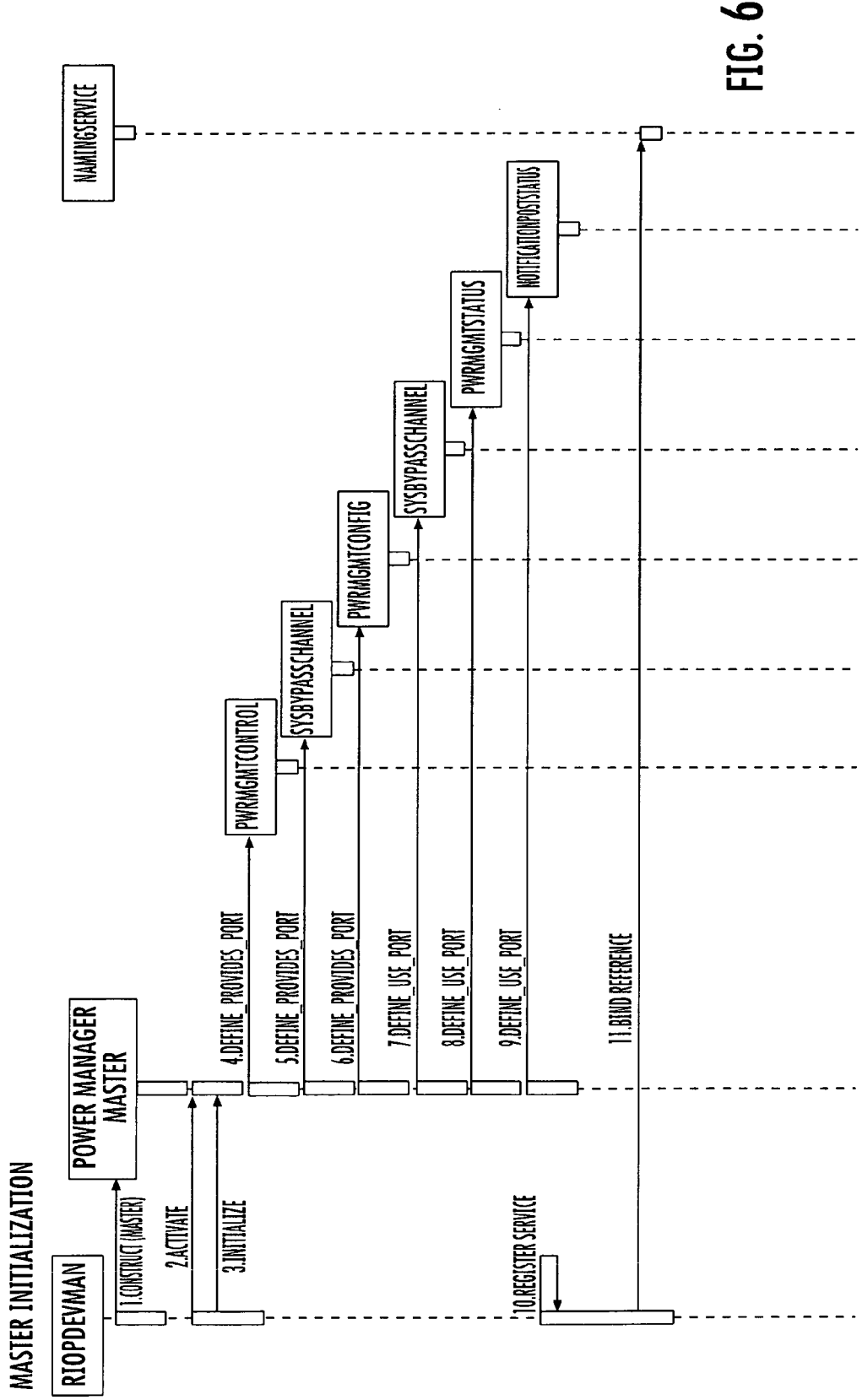
FIGS. 6-10 are sequence diagrams for respective master and slave initialization, power down, and the red-to-black and black-to-red wakeup in one non-limiting example.

Various sequence diagrams are described relative to FIGS. 6-10 and the sequences described. The initialization sequence is shown in FIG. 6 and the following description is described relative to the sequence diagram in FIG. 6.

With reference to any of these diagrams in FIGS. 6-10, it should be understood that red and black sides and sequences could be reversed depending on the design.

1. Red side Device Manager constructs the master Power Management Service component.
2. Device Manager activates the Master Power Management Service Servant(s).
3. Device Manager initializes the Master Power Management Service.
4. Master Power Management Service Constructs its Provides Ports.
5. Master Power Management Service Constructs its Uses Ports.
6. Device Manager Registers the Power Management Service.
7. Device Manager Binds the Master Power Management Service in the Naming Service.

Figure 7:
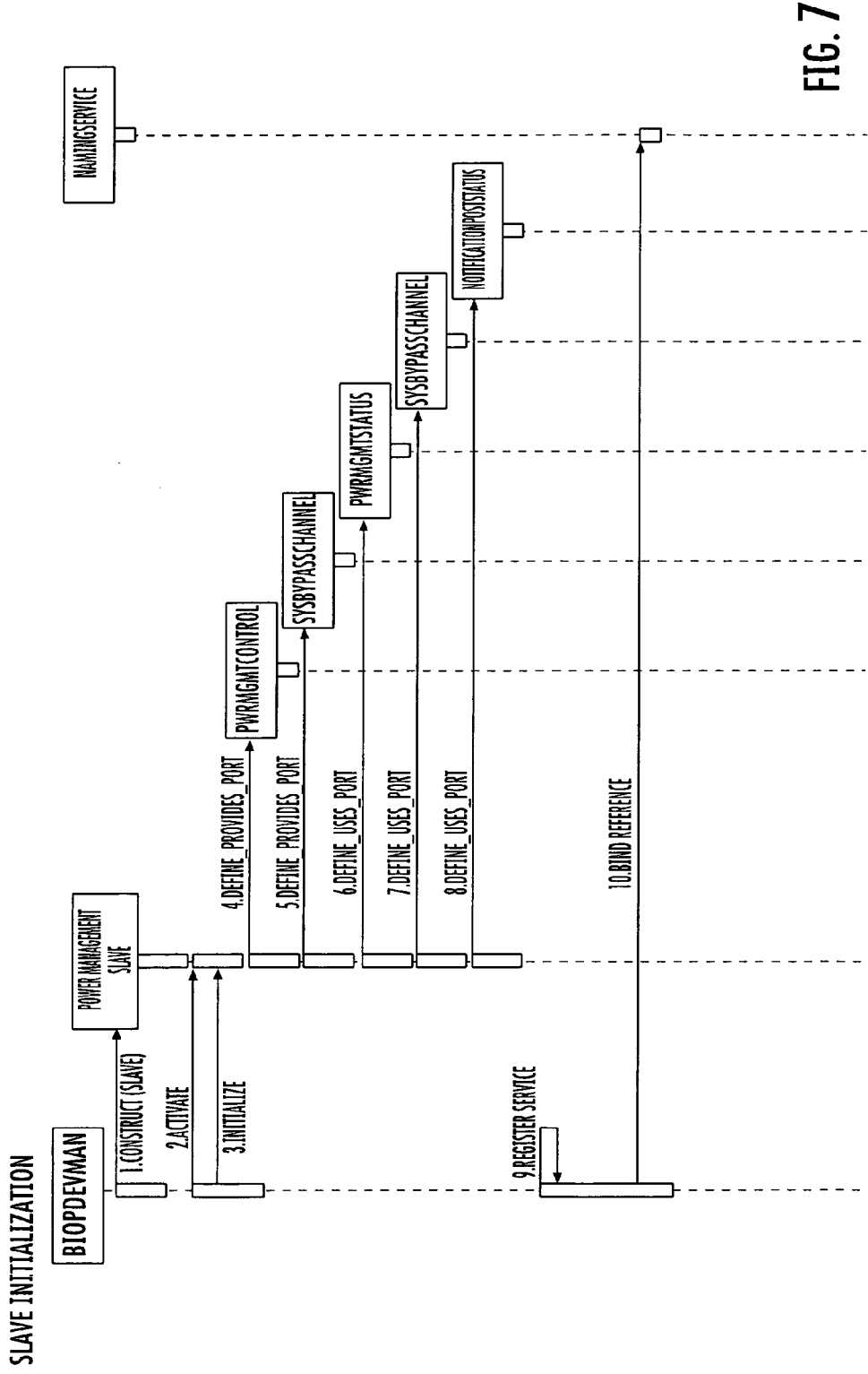

Slave initialization is described relative to FIG. 7.

1. Black Side Device Manager Constructs the Slave Power Management Service.
2. Device Manager activates the Slave Power Management Service Servant(s).
3. Device Manager initializes the Slave Power Management Service.
4. Slave Power Management Service Constructs its Provides Ports.
5. Slave Power Management Service Constructs its Uses Ports.
6. Device Manager Registers the Power Management Service.
7. Device Manager Binds the Slave Power Management Service in the Naming Service.

Figure 8:
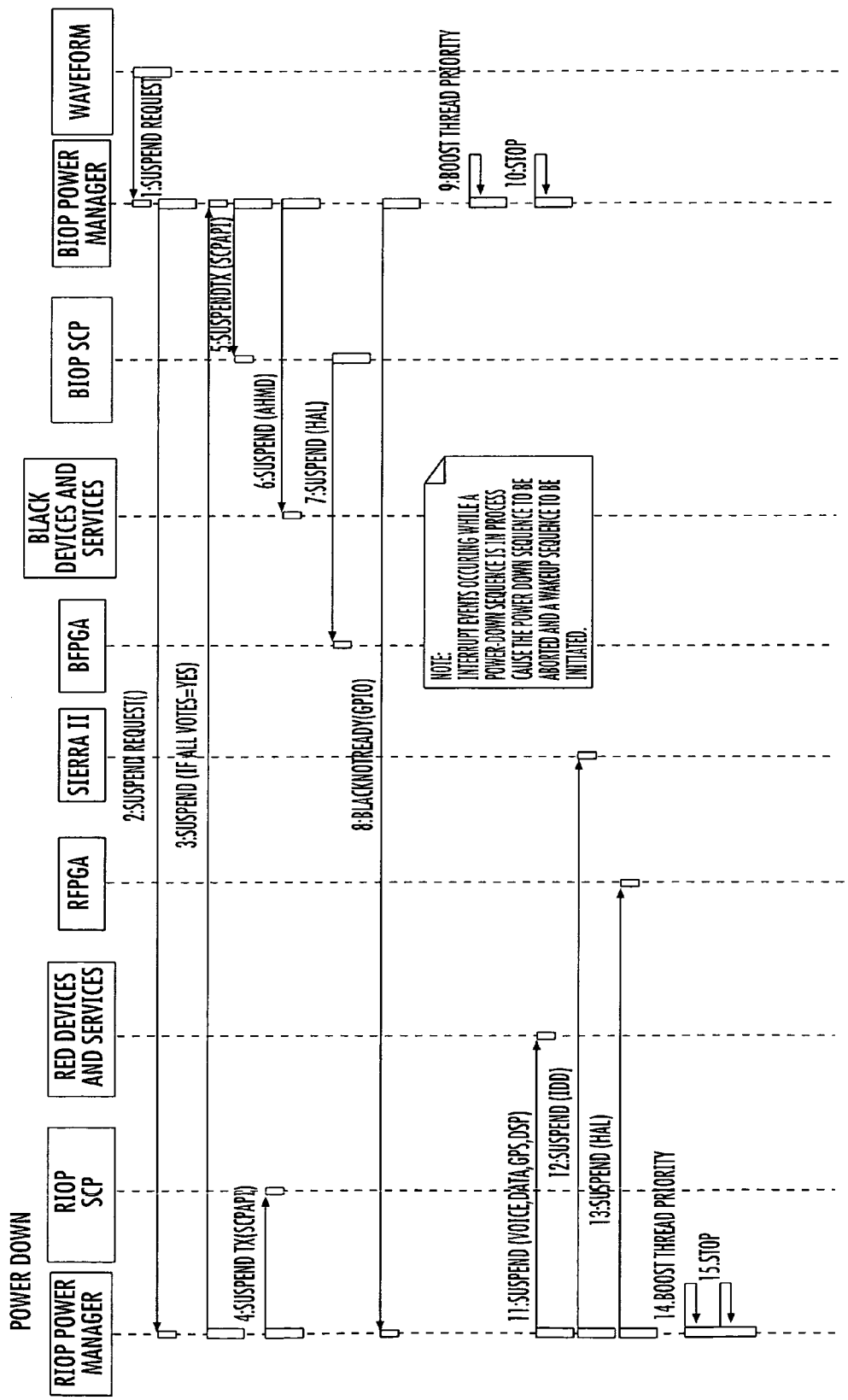

Power Down Suspend is described relative to FIG. 8.

1. Power down is initiated by the waveform at a point in time where the waveform intends to be squelched. Request is issued to local Power Management Service (which relays the request to the Master Power Management Service.
2. If all clients of the Power Management Service agree that it is okay to suspend, the Master Power Management Service then coordinates with Slave Power Management Service to power down the radio. Sequencing of power down on both sides is done concurrently.
3. Once the power management services are finished, the red and black general purpose processors, Voice DSP and the cryptographic subsystem are stopped.

Interrupt Events occurring while a power-down sequence is in process will cause the Power Down sequence to be aborted and a Wakeup sequence to be initiated.

Figure 9:
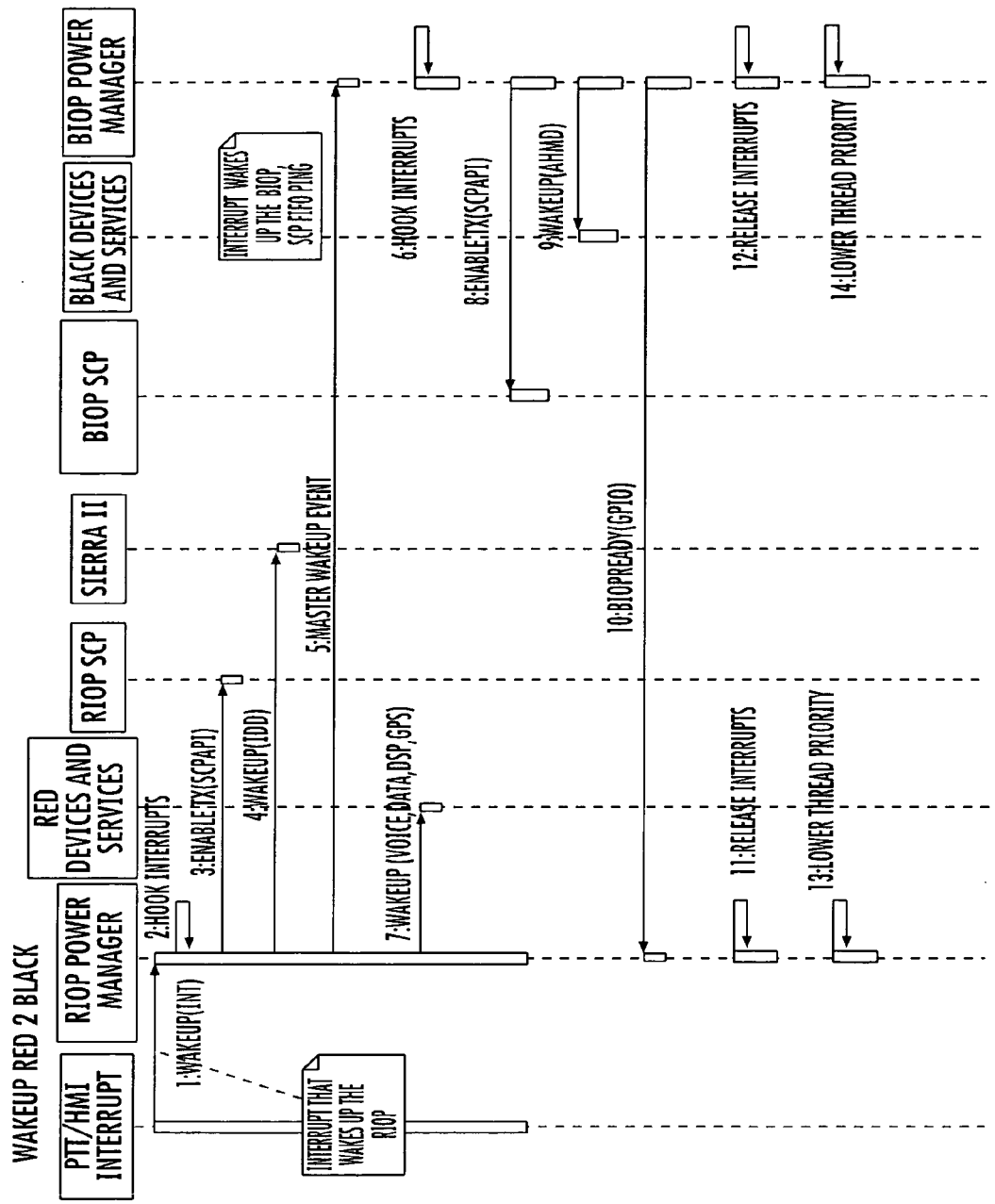

Red-to-black circuit wakeup is described relative to FIG. 9.

1. A keyline or user interface event wakes up the red side of the radio.
2. The Master Power Management Service coordinates the red side power up.
3. The Master Power Management Service coordinates with the Slave Power Management service to get the Black side powered up.
4. Master Power Management Service propagates the event that caused the wakeup.

Figure 10:
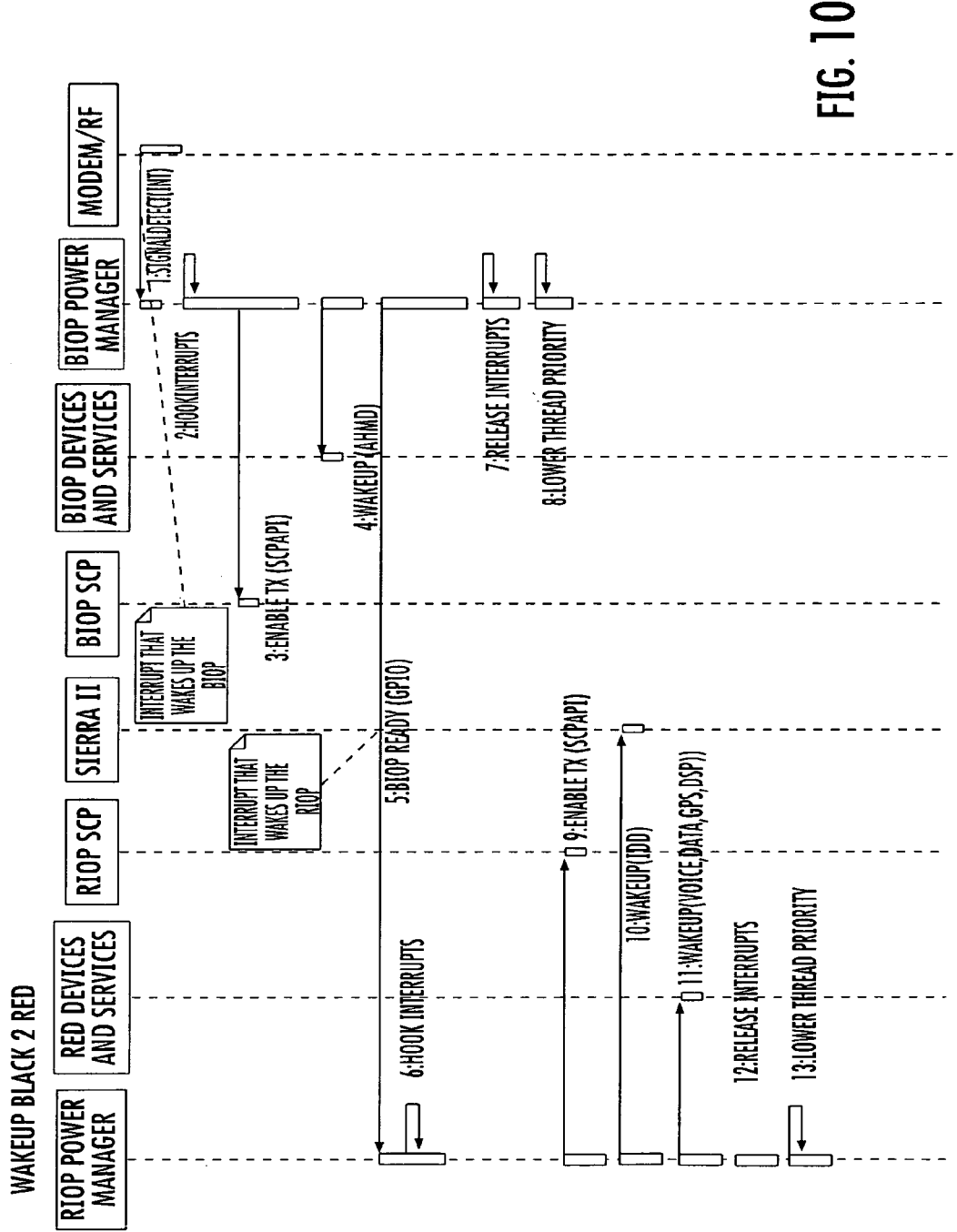

Red to black wakeup is described relative to FIG. 10.

1. Waveform signal detection wakes up the black side of the radio.
2. The Slave Power Management Service powers up the black side of the radio.
3. The Slave Power Management Service Notifies the Black Power Management Service that it should wake up.
4. The Master Power Management Service gets the black side of the radio up.
5. The Slave Power Management Service allows the event that caused the wake up to propagate (signal detect).

A typical waveform utilizing the power management service can be thought of as a state machine in one of three major states. These states include:

1. Active Receive;
2. Active Transmit; and
3. Quiescent. This is a state in which there is no current radio activity or over the air signaling. In this state the radio can be suspended to some degree (the level depending on the nature of the waveform). In some waveforms this state can be decomposed further into sub-states for implementation of sleep-sniff cycles.

The transition into a quiescent state is used by the waveform to initiate the appropriate level of suspension of the radio components (via the Power Management Service(s)). The transition out of the quiescent state (to an active state) occurs through the generation of ordinary events (either radio interrupt events or signal present interrupt events), which are intercepted by the power management service and used to restart the radio components (including the waveform).

Figure 11:
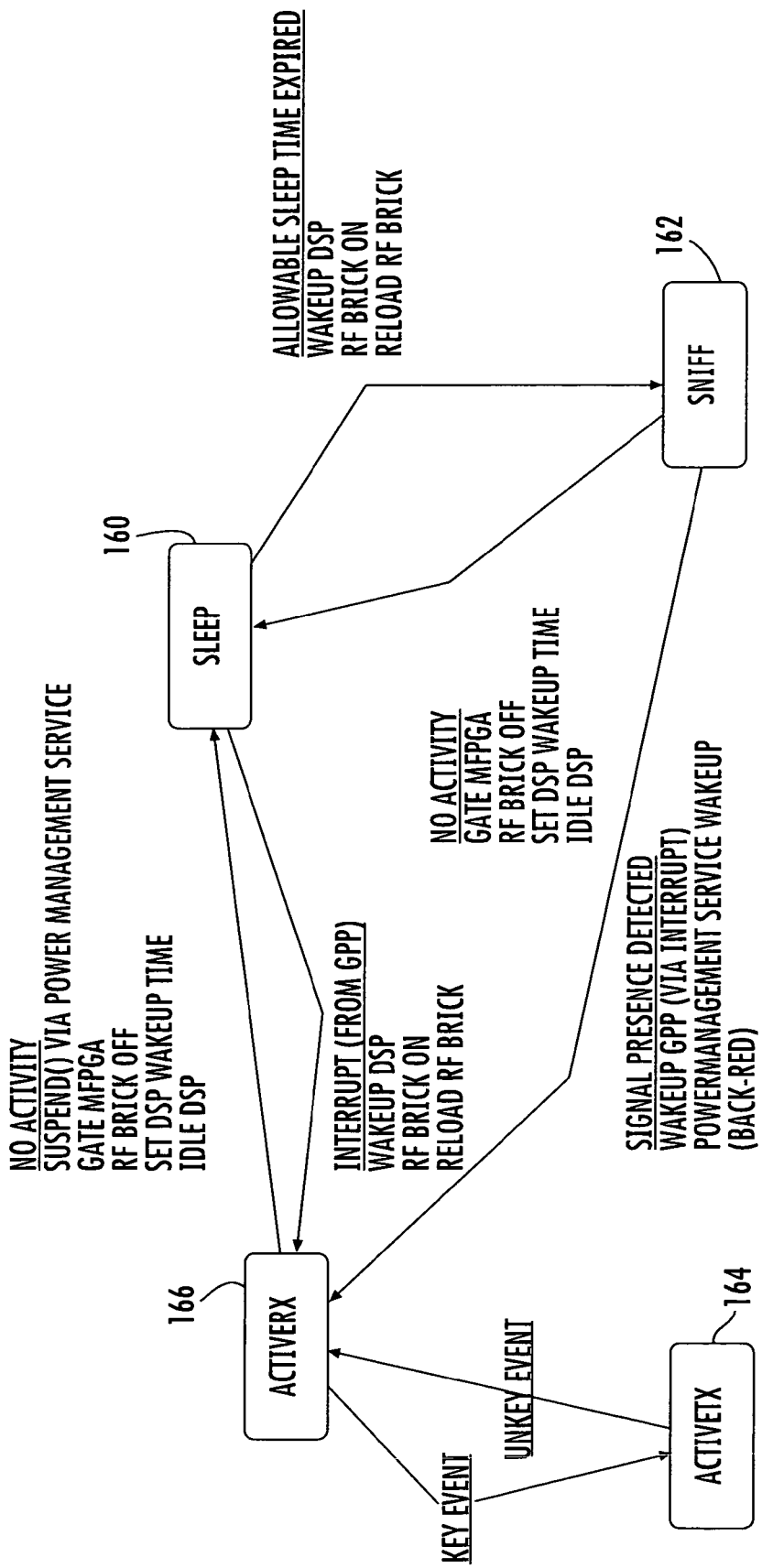
FIG. 11 is an example of a sample waveform state machine operable with the power management system in accordance with one example of the present invention.

The state diagram is shown in FIG. 11 outlines an example of the required behavior of the waveform as it utilizes power management services. In this example, there are two quiescent states, Sleep 160 and Sniff 162. The different states are shown as an Active Transmit 164, Active Receive 166 and the two quiescent states of Sleep 160 and Sniff 162.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A software defined radio comprising:
a radio circuit powered by a battery and comprising an RF module and a pair of radio subsystems each having radio components that draw power from a battery;
an executable radio software system operable with the radio circuit and defining an operating environment that allows a waveform application to operate with the radio circuit for transmitting and receiving voice and data; and
a power management service operable with the pair of radio subsystems and with the executable radio software system and a currently running waveform application to coordinate the power within the radio circuit among the radio components within the pair of radio subsystems, said power management service including a plurality of different power management states wherein a first subset of the plurality of different power management states are delegated to the operating platform environment and a second subset of the plurality of different power management states are delegated to currently running applications, and the executable radio software system translates high level power management events into calls to the power management service to reduce system power based on a currently running waveform application, wherein at least one power management state is delegated for each respective radio component with selected applications turning the RF module on and off in a specific duty cycle providing power saving and maintaining probability of signal detection, wherein said executable radio software system and currently running waveform application are configured as clients of the power management service and further comprising a control port through which said clients manage power and are configured to vote to suspend power to radio components, sequence through suspend actions, abort a suspend sequence, or reverse any previous power management action.

2. A software defined radio according to claim 1, wherein said power management service is operable for coordinating radio components in a master slave configuration.

3. A software defined radio according to claim 1, wherein said pair of radio subsystems comprises a command general purpose processor and a data general purpose processor, wherein said power management service is operable for coordinating the command general purpose processor as a master or slave and the data general purpose processor as a master or slave.

4. A software defined radio according to claim 1, wherein power management service is operable with the waveform application to enter an active receive, active transmit and quiescent state.

5. A software defined radio according to claim 1, wherein said power management service includes a control port through which any additional radio components within said pair of radio subsystems are clients and operable for control by said power management service.

6. A software defined radio according to claim 5, wherein clients are operable to be queried by said power management service for acknowledging a suspension of power and initiating a sequence of power suspend actions by the power management service.

7. A software defined radio according to claim 6, wherein the radio is configured such that any client can initiate an interrupt to the power management service such that the sequence of power suspend actions are aborted.

8. A software defined radio according to claim 7, configured such that, after the sequence of power suspend actions are aborted, any power suspend actions already occurring are reversed.

9. A software defined radio according to claim 1, wherein said radio components comprise a global positioning sensor (GPS), a data device having data termination equipment (DTE) serial ports, and a voice circuit having a digital signal processor (DSP), wherein said power management service is operative for managing a) on/off cycles for the GPS, b) power to DTE serial ports, and c) power settings to the DSP for waveform applications.

10. A system for controlling power within a software defined radio comprising:
   a command and data radio subsystem having an operating environment, each radio subsystem having radio components to be powered by a battery;
   an RF module through which RF signals of the software defined radio are transmitted; and
   a power management service operable with the radio components and with the executable radio software system and a currently running waveform application to coordinate the power among the radio components, said power management services including a plurality of power management states wherein a first subset of the plurality of power management states are delegated to the operating platform environment and a second subset of the plurality of power management states are delegated to currently running applications, and the executable radio software system translates high level power management events into calls to the power management service to reduce system power based on a currently running waveform application, wherein at least one power management state is delegated for each respective radio component with selected applications turning the RF module on and off in a specific duty cycle providing power saving and maintaining probability of signal detection, wherein said executable radio software system and currently running waveform application are configured as clients of the power management service and further comprising a control port through which clients manage power and are configured to vote to suspend power to radio components, sequence through suspend actions, abort a suspend sequence, or reverse any previous power management action.

11. A software defined radio according to claim 10, wherein said power management service is operable for coordinating radio components in a master slave configuration.

12. A software defined radio according to claim 10, and further comprising a command general purpose processor and a data general purpose processor, wherein said power management service is operable for coordinating the command general purpose processor as a master or slave and the data general purpose processor as a master or slave.

13. A software defined radio according to claim 10, wherein power management service is operable with a waveform application to enter an active receive, active transmit and quiescent state.

14. A software defined radio according to claim 10, wherein said power management service includes a control port through which any additional radio components are clients and operable for control by said power management service.

15. A software defined radio according to claim 14, wherein said clients are operable to be queried by said power management service for acknowledging a suspension of power and initiating a sequence of power suspend actions by the power management service.

16. A software defined radio according to claim 15, configured such that, when any client initiates an interrupt to the power management service, the sequence of power suspend actions are aborted.

17. A software defined radio according to claim 16, configured such that, after the sequence of power suspend actions are aborted, any power suspend actions already occurring are reversed.

18. A software defined radio according to claim 10, wherein said radio components comprise a global positioning sensor (GPS), a data device having data termination equipment (DTE) serial ports, and a voice circuit having a digital signal processor (DSP), wherein said power management service is operative for managing a) on/off cycles for the GPS, b) power to DTE serial ports, and c) power settings to the DSP for waveform applications.

19. A method for controlling power within a software defined radio comprising:
   providing command and data radio subsystems having an operating environment conformable to a specification and an executable radio software system that operates with a waveform application and includes an RF module, and each having a plurality of radio components to be powered by a battery; and
   coordinating the power among the radio components in a master slave configuration between the command and data radio subsystems using a power management service operable with the radio components and with a currently running waveform application and a plurality of different power management states while delegating a first subset of the plurality of different power management states to the operating environment and delegating a second subset of the plurality of different power management states to currently running applications and translating high level power management events into calls to the power management service to reduce system power based on a currently running waveform application and delegating at least one power management state for each respective radio component and turning the RF module on and off in a specific duty cycle, and further comprising configuring the executable radio software system and currently running waveform application as clients of the power management service, and further comprising the clients managing power through a control port and voting to suspend power to radio components, sequence through suspend actions, abort a suspend sequence, or reverse any previous power management action.

20. A method according to claim 19, which further comprises coordinating the command general purpose processor as a master or slave and the data general purpose processor as a master or slave.

21. A method according to claim 19, which further comprises controlling any additional radio components through a control port of a power management service.

* * * * *